United States Patent [19]

Pineger et al.

[11] 4,362,565

[45] Dec. 7, 1982

[54] COLOR FORMER COMPOSITION

[75] Inventors: Reginald N. Pineger, Stockport; Malcolm C. Clark, Cheadle, both of England

[73] Assignee: Ciba-Geigy Corporation, Ardsley, N.Y.

[21] Appl. No.: 197,446

[22] Filed: Oct. 16, 1980

[30] Foreign Application Priority Data

Oct. 26, 1979 [GB] United Kingdom ................ 7937264

[51] Int. Cl.$^3$ .............................................. C09D 11/00

[52] U.S. Cl. ........................................ 106/21; 106/32; 106/285; 106/308 Q

[58] Field of Search ................... 106/308 Q, 316, 272, 106/21, 32; 404/76; 252/88

[56] References Cited

U.S. PATENT DOCUMENTS

| | | | |
|---|---|---|---|
| 913,476 | 2/1909 | Duffy | 252/88 |
| 1,916,163 | 6/1930 | Worth | 252/88 |
| 3,740,191 | 6/1973 | Ware | 252/88 |
| 4,115,143 | 9/1978 | Batzar | 106/308 Q |

FOREIGN PATENT DOCUMENTS

| | | |
|---|---|---|
| 1329077 | 9/1973 | United Kingdom . |
| 1352597 | 5/1974 | United Kingdom . |
| 1359512 | 7/1974 | United Kingdom . |
| 1371807 | 10/1974 | United Kingdom . |
| 1398199 | 6/1975 | United Kingdom . |
| 1516383 | 7/1978 | United Kingdom . |
| 1517647 | 7/1978 | United Kingdom . |
| 1519742 | 8/1978 | United Kingdom . |
| 1521148 | 8/1978 | United Kingdom . |
| 1526353 | 9/1978 | United Kingdom . |

*Primary Examiner*—Allan Lieberman
*Assistant Examiner*—Pat Short
*Attorney, Agent, or Firm*—Edward McC. Roberts

[57] ABSTRACT

A solid color former composition is produced in a low-dusting form by admixture with 0.1 to 10% by weight, based on the weight of the color former, of an organic hydrophobic liquid or low melting solid, which does not react with the color former.

5 Claims, No Drawings

COLOR FORMER COMPOSITION

The present invention relates to the production of colour formers in a dust-free or only slightly dusting form.

Because colour formers are generally white or pastel coloured, no attempt has been made hitherto to confer non-dusting properties to them. However, tests have shown that the colour former powders as normally sold have poor non-dusting properties. It is an object of the present invention to improve their non-dusting properties. Such improved properties will assist in the handling of the compounds and make them less of a health hazard to operators.

We have found that many of the conventional non-dusting products which are used to treat coloured dyestuffs, such as anionic surfactants, anionic surfactant/oil mixtures, non-ionic surfactants and their mixtures with oils, water-soluble solvents and their mixtures with oils, e.g. petroleum sulphonates, sulphonated castor oil, dinaphthylmethane sulphonates, polyethylene glycols, cannot be used to de-dust colour formers, because of problems of permature colour development and/or difficulty in dissolving in hydrophobic solvents and/or problems at the encapsulation stage and/or partial deactivation of the colour formers.

We have found that these problems can be overcome by using hydrophobic non-dusting agents.

Accordingly, the present invention provides a solid colour former composition which comprises from 0.1 to 10% by weight, based on the weight of the colour former, of an organic hydrophobic liquid or low melting solid, which does not react with colour former.

We have surprisingly found that by the use of such hydrophobic non-dusting agents, the efficiency of the colour former in producing a coloured image by contact with an acid clay, phenolic resin or any other means, is not significantly reduced when allowance is made for the dilution effect of the non-dusting agent. In addition, the hydrophobic non-dusting agent does not interfere with the dissolving of the colour former or the encapsulation process, and it does not impair the tinctorial strength of the colour former.

The hydrophobic non-dusting agent is preferably a liquid and, more preferably, a non-volatile liquid having a boiling point of at least 50° C., preferably at least 100° C. If a low melting solid is used it may be one having a melting point of below 150° C., preferably below 70° C. When a solid non-dusting agent is used it is applied at a temperature above its melting point. Preferably a solid non-dusting agent is used which is molten at the temperature at which the colour former is dried during its production.

Examples of suitable non-dusting agents are kerosene, hydrogenated and partially hydrogenated terphenyls, dibutyl or dioctyl phthalate, dioctyladipate, paraffins, chloroparaffins, alkyl benzenes and naphthalenes, machine oils, water insoluble ethers and esters, n-octadecane, decalin, tetralin, durene, pentamethyl benzene, β-methyl naphthalene, diisopropylnaphthalene, dibenzyl, monoisopropyldiphenyl, ethyl terephthalate and mixtures thereof. The preferred non-dusting agents are kerosene, partially hydrogenated terphenyl, di-n-butylphthalate or mixtures thereof.

The non-dusting agent is used in amounts of 0.1 to 10% by weight of the colour former, preferably, 0.5 to 6% by weight.

The non-dusting agent may be added by any method known per se. For example, it may be added to, e.g. sprayed or poured into a mixer which is charged with colour former; added to a solution or suspension of colour former before spray drying or added to a dryer before, during or after drying.

Any colour former which may be used in pressure-sensitive, heat-sensitive or light-sensitive systems may be effectively de-dusted by the process of the invention, including phthalides (incorporating substituted aryl groups and/or substituted heterocyclic groups and/or substituted pericyclic groups), substituted fluorans which may contain benzene or heterocyclic moieties, azomethines, chromenopyrazoles, chromenoindoles, phenothiazines, benzothiophenochromenes, phenoxazines, spiropyrans, leuco auramines, leuco triaryl methanes, carbazolyl methanes, chromeno or chromano colour formers, metal complex forming compounds, associated dye salts, coumarins or di- or tri-arylcarbinols. Examples of such suitable colour formers are: crystal violet lactone, 3,3-(bisaminophenyl)phthalides, 3,3-(bis-substituted indolyl)-phthalides, 3-(aminophenyl)-3-indolyl-phthalides, 6-dialkylamino-2-n-octylamino-fluorans, 6-dialkylamino-2-arylamino-fluorans, 6-dialkylamino-3-methyl-2-arylamino-fluorans, 6-dialkylamino-2- or 3-lower alkyl-fluorans, 6-dialkylamino-2-dibenzylamino-fluorans, bis-(aminophenyl)-furyl-, -phenyl- or -carbazolyl-methanes, benzoyl leucomethylene blue, benzoyl-dialkylamino-phenothiazines or phenoxazines, or bis-dialkylamino-benzhydrol-arylsulfinates.

The invention is illustrated by the following Examples:

EXAMPLE 1

3,3-Bis-(p-dimethylamino-phenyl)-6-(dimethylamino) phthalide was charged to a mixer followed by 2% by weight of odourless kerosene. After mixing thoroughly the resulting product was virtually dust free.

EXAMPLE 2

Following the procedure of Example 1, 10-benzoyl-3,7-bis (dimethylamino) phenothiazine was rendered virtually dust free by the use of 6% by weight of odourless kerosene.

EXAMPLE 3

Following the procedure of Example 1, 2-dibenzylamino-6-diethylaminofluoran was rendered virtually dust free by the use of 4% by weight of odourless kerosene.

EXAMPLE 4

Following the procedure of Example 1, 6-diethylamino-1,3-dimethylfluoran was rendered almost completely dust free by the use of 2% by weight of partially hydrogenated terphenyl.

EXAMPLE 5

Following the procedure of Example 1,3,3-bis (1'-ethyl-2'-methylindol-3'-yl) phthalide was formed into a powder having excellent non-dusting characteristics by the use of 2% by weight of odourless kerosene.

EXAMPLE 6

Following the procedure of Example 1, 6-diethylamino-2-(n-octylamino) fluoran was formed into a powder having excellent non-dusting characteristics by the use of 4% by weight of odourless kerosene.

EXAMPLE 7

Following the procedure of Example 1, 3,3-bis (p-dimethylaminopheyl)-6-(dimethylamino) phthalide was changed from a dusty powder to a powder with good non-dusting characteristics by mixing with 2% by weight of di-n-butyl phthalate.

EXAMPLE 8

Following the procedure of Example 1, 3,3-bis(p-dimethylaminopheyl)-6-(dimethylamino) phthalide was rendered virtually dust free by using 3% by weight of a mixture of kerosene and partially hydrogenated terphenyl.

EXAMPLE 9

10-benzoyl-3,7-bis (dimethylamino) phenothiazine was produced in a form with good non-dusting characteristics by mixing at 100° C. with 1.5% by weight of paraffin wax of softening temperature 59° C.

Following the procedures described in any one of the Examples 1 to 9, also the following colour formers are formed into powders having non-dusting characteristics:

2-anilino-3-methyl-6-diethylamino-fluoran,

3'-phenyl-7-diethylamino-2,2'-spirodi(2H -1-benzopyran), 2,6-diphenyl-4-(4'-dimethylamino-phenyl)-pyridine, 4,4'-bis-(dimethylamino)-benzhydrol-p-toluene-sulphinate, 6,6-bis-(4'-dimethylaminophenyl)6H-chromeno-[4,3-b] indole, 1-phenyl-3-methyl-7-diethylaminospiro[(1)benzopyrano-[2,3-c]pyrazole-4(1H), 1'(3'H)isobenzofuran]-3'-one, 9-diethylaminobenzo(a)fluoran, 2-[3,6-bis-diethylamino)-9-(2'-chloroanilino)-xanthyl]-benzoic acid lactam, bis-4,4'-[N,N-dimethylanilino]-amino-methane, 3,7-bis-(diethylamino)-10-benzoyl-phenoxazine, or tris-(N-ethyl-carbazol-3-yl)methane

What we claim is:

1. A solid colour former composition comprising a colour former and from 0.1 to 10% by weight, based on the weight of the colour former, of an organic hydrophobic liquid which does not react with the colour former selected from the group consisting of kerosene, partially hydrogenated terphenyl and mixtures thereof.

2. A composition according to claim 1, wherein the organic hydrophobic liquid is kerosene.

3. A composition according to claim 1, wherein the organic hydrophobic liquid is partially hydrogenated terphenyl.

4. A composition according to claim 1, wherein the amount of organic hydrophobic liquid is from 0.5 to 6% by weight, based on the weight of the colour former.

5. A process for the production of a solid non-dusting or only slightly dusting colour former composition which comprises treating the colour former with 0.1 to 10% by weight, based on the weight of the colour former, of a hydrophobic liquid which does not react with the colour former, selected from the group consisting of kerosene, partially hydrogenated terphenyl and mixtures thereof, wherein the organic hydrophobic liquid is added to a mixer which is charged with the colour former, or to a solution or suspension of the colour former which is then spray dried, or to a dryer, containing the colour former, before, during or after drying.

* * * * *